(12) United States Patent
Raman et al.

(10) Patent No.: US 8,914,044 B2
(45) Date of Patent: Dec. 16, 2014

(54) METHOD AND SYSTEM FOR ASSOCIATING CONTEXT INFORMATION WITH DEFINED LOCATION DATA

(75) Inventors: Madhusudan Raman, Sherborn, MA (US); Renu Chipalkatti, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/475,592

(22) Filed: May 18, 2012

(65) Prior Publication Data
US 2013/0310078 A1 Nov. 21, 2013

(51) Int. Cl.
*H04W 24/00* (2009.01)
*H04W 4/02* (2009.01)
*H04W 64/00* (2009.01)

(52) U.S. Cl.
CPC ................ *H04W 4/02* (2013.01); *H04W 64/00* (2013.01)

USPC ................... 455/456.3; 455/456.1; 455/456.6

(58) Field of Classification Search
None
See application file for complete search history.

(56) References Cited

U.S. PATENT DOCUMENTS

| | | | |
|---|---|---|---|
| 8,433,344 B1 * | 4/2013 | Virga | 455/457 |
| 2010/0331016 A1 * | 12/2010 | Dutton et al. | 455/456.3 |
| 2012/0197524 A1 * | 8/2012 | Beyeler et al. | 701/426 |
| 2012/0259696 A1 * | 10/2012 | Monteverde | 705/14.49 |

* cited by examiner

*Primary Examiner* — Suhail Khan

(57) ABSTRACT

An approach for enabling contextual categories to be associated and scored in connection with a defined geographic region is described. An affinity determination platform identifies an anomaly in a score associated with at least one contextual category of a defined geographic region based on information related to the points-of-interest. The affinity determination platform generates an updated score to associate with the at least one contextual category based on the analysis of verification information related to the defined geographical region and associates the updated score with the contextual category.

20 Claims, 10 Drawing Sheets

| CONTEXT TYPE 401 | EXPLANATION OF ASSOCIATED DATA POINTS 403 |
|---|---|
| Attractions and Recreation | Places and points of interest that fall under the road concept of "attractions" or "recreation" (e.g., museum, beaches, fishing spots). |
| Auto Demographics | Vehicles in operation by make, model and segment from highest to lowest affinity by segment: vehicle type (e.g., luxury, sporty, SUV), ranking (e.g., garage predictor ranking by segment and make), fuel type, vehicle condition (e.g., new, used, pre-owned) |
| Businesses | Places and points of interest that can be considered "business listings" (e.g., restaurants, workplaces, auto repair) |
| Carrier | Mobile network carriers in use |
| Camera Type | Camera type |
| Coupon Redemption — 407 | Coupon redemption data by number of items sold and revenue index (e.g., by length of campaign, campaign type) — 409 |
| Crime | Classification of standard crime types by time and location (e.g., temporal dataset updated periodically) |
| Device OS | Device operating system by type, manufacturer, etc. |
| Digital Demographics | Dynamic out-of-home demographics, periodically updated (e.g., gender, home location, interest, income) |
| Educational Institution | Listings of different types of educational institutions (e.g., higher education, K-12, universities) |
| Events | Detailed ontology of event listings by type temporal dataset updated periodically (e.g., farmers market, trade show, football game) |

FIG. 4B
410

| Coupon Redemption |
|---|
| Number_Sold—>Automotive |
| Number_Sold—>Baby |
| Number_Sold—>Boot Camp |
| Number_Sold—>Bridal |
| Number_Sold—>City Tours |
| Number_Sold—>Concerts |
| Number_Sold—>Dental |
| Number_Sold—>Entertainment |
| Number_Sold—>Facial |
| Number_Sold—>Food & Grocery |
| Number_Sold—>Golf ~413 |
| Number_Sold—>Hair Removal |
| Number_Sold—>Health & Beauty |
| Number_Sold—>Jewish |
| Number_Sold—>Life Skills Classes |
| Number_Sold—>Manicure & Pedicure |
| Number_Sold—>Massage |
| Number_Sold—>Museums |
| Number_Sold—>Automotive Services |
| Number_Sold—>Bar & Club |
| Number_Sold—>Bowling |
| Number_Sold—>Chiropractic |
| Number_Sold—>Comedy Clubs |
| Number_Sold—>Dance Classes |
| Number_Sold—>Dermatology |
| Number_Sold—>Eye & Vision |
| Number_Sold—>Fitness Classes |
| Number_Sold—>Gifts |
| Number_Sold—>Gym |
| Number_Sold—>Hair Salon |
| Number_Sold—>Home Services |
| Number_Sold—>Kids |
| Number_Sold—>Makeup |
| Number_Sold—>Martial Arts |
| Number_Sold—>Mens Clothing |
| Number_Sold—>N/A |

440

METHOD AND SYSTEM FOR ASSOCIATING CONTEXT INFORMATION WITH DEFINED LOCATION DATA

BACKGROUND INFORMATION

Service providers are continually challenged to deliver value and convenience to consumers by providing compelling network services and advancing the underlying technologies. One area of interest has been the development of location based services. Typically, most location based services and real-time context processing services rely on the detection or acquiring of context information related to the user, both real-time and static, to execute their various functions and features. This may include, for example, global positioning data and motion data (e.g., as provided via the user's mobile device), demographic information, user ranking data, user profile information, behavioral data, etc. Unfortunately, traditional approaches provide no convenient way by which location based service providers may render contextually relevant applications and services without reliance upon user-centric context data.

Based on the foregoing, there is a need for enabling contextual categories to be associated and scored in connection with a defined geographic region.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 4A and 4B are tables maintained by the affinity determination platform for defining different contextual categories, according to various embodiments;

DESCRIPTION OF THE PREFERRED EMBODIMENT

An apparatus, method and software for enabling various contextual categories to be associated with and scored by their level of affinity with various points-of-interest located within the defined contextual categories is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form to avoid unnecessarily obscuring the present invention.

Although the various exemplary embodiments are described with respect to points-of-interest (POIs) located in a given geographic region, it is contemplated that these embodiments have applicability to any elements capable of being associated with a given location. This may include, for example, events, venues, activities, promotions, devices, people, buildings, landmarks and the like. For the purpose of illustration, points-of-interest (POIs) may correspond to any such elements.

Figure 1:
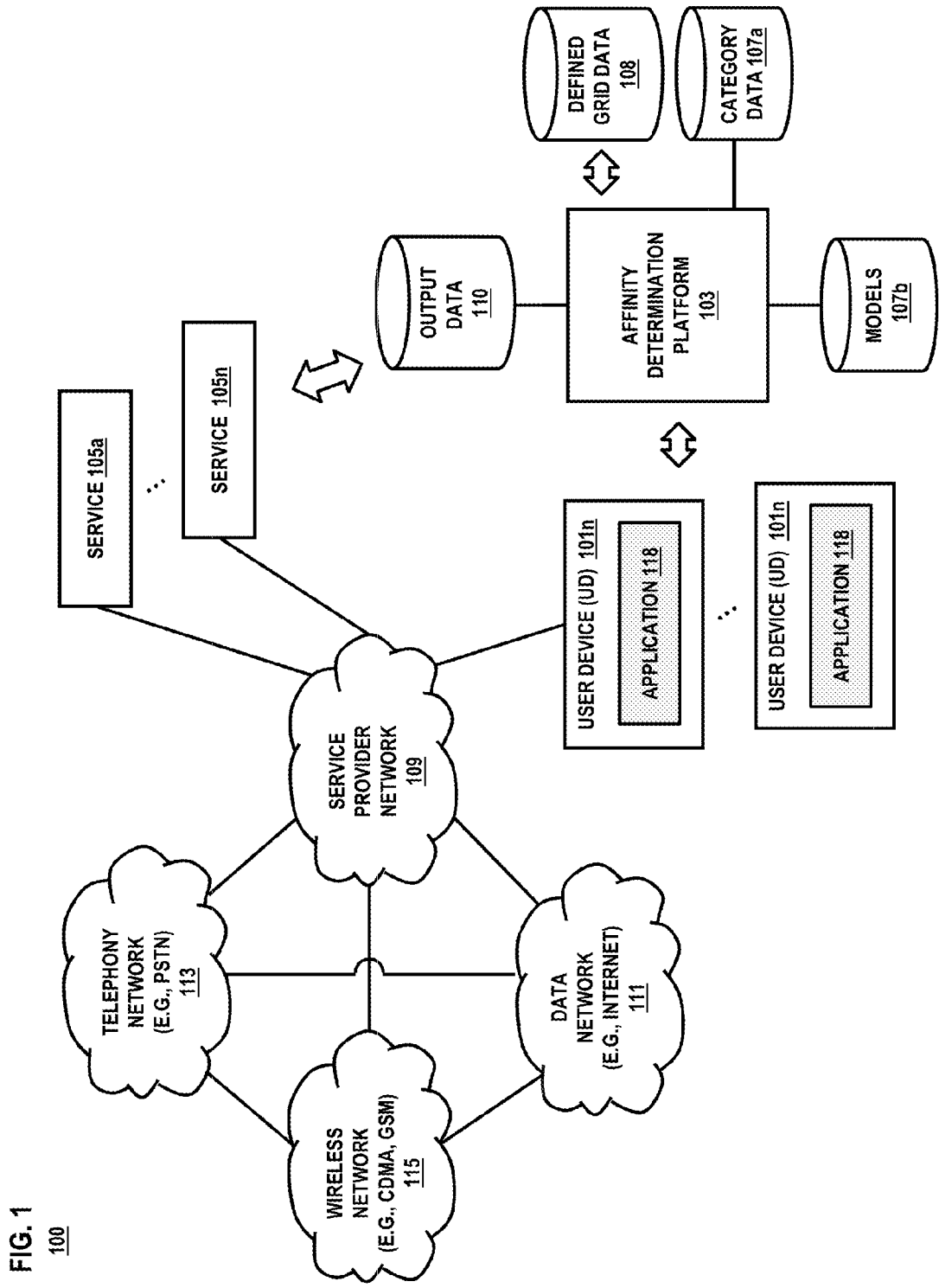
FIG. 1 is a diagram of a system for enabling contextual categories to be associated and scored in connection with a defined geographic region, according to one embodiment.

FIG. 1 is a diagram of a system for enabling contextual categories to be associated and scored in connection with a defined geographic region. As noted previously, many mapping applications, shopping applications, social networking applications and other commonly used software tools interact with a location or context based service. While the applications may themselves operate at a device, the service supports execution of various features of the applications. For example, the service may process sensor data (i.e., location data, position data, sound data, application use data) gathered by the device to determine a real-time context to associate with the user or their environment. In other instances, the service may access static data such as demographic information, user ranking data, profile information, behavioral data, and the like to discern a context related to an activity or event pertaining to the user.

Unfortunately, there is currently no convenient solution by which location based service providers may render contextually relevant applications and services without reliance upon user-centric context data. Also, service providers that offer context and/or location based services are limited in their ability to determine the propensity of a given geographic region to be associated with a given context.

To address this issue, the system 100 includes an affinity determination platform 103 that enables one or more contextual categories to be associated with a defined geographic region featuring multiple POIs. In addition, the platform 103 enables a score to be assigned to respective categories by defined geographic region based on a level of affinity of the category with various points-of-interest located within the defined geographic region.

According to certain embodiments, the affinity determination platform 103 maintains contextual category data 107a, referred to as categories data 107a. The categories data 107a includes a list of context types and associated data points related to each respective context type for a defined geographic region. The data points may include information for characterizing, describing (qualitatively) or quantifying various POI associated with a given context type. By way of example, a context type of "Events" may be maintained as category data 107a for defining an event related context corresponding to the defined geographic region. Associated data points/information related to this context type may include event names, event types, times, sponsors and event locations. As another example, a context type of "Businesses" may be maintained in the database 107a for defining a business related context. Associated data points/information for this category may include, for example, business names, business and/or industry types (e.g., marketing firms, engineering firms), employee counts, revenue ranges, business rankings and business locations.

It is noted that the data points may be static or dynamic values depending on the context type. For example, data points for referencing a specific name of a landmark or address/location may require less frequent updating. Conversely, data points for referencing a specific volume of sales within a defined time period (e.g., current, by hour, by week), a number of coupon redemptions, a number of emergency services, a rate of use of a service, etc., may require frequent updating. Hence, the data points for association with a given contextual category may be accessed from various data sources provided by a service provider subscribed to access the affinity determination platform 103 or by various third party logistics sources. Also of note, the categories data 107a may be accessed by the platform 103 for cross-reference against POIs corresponding to the defined geographic region.

In certain embodiments, the defined geographic region includes various named, tagged and mapped location points and/or POI. For the purpose of illustration, the affinity determination platform 103 accesses this data from a defined grid database 108, such as the United States National Grid reference system or any other reference grid. Alternatively, the defined grid data 108 may include any other location data source, geodetic data source, topographic data source, geographic information system or the like for specifying and naming points/coordinates within a particular geographic region.

The affinity determination platform 103 may be configured to identify POIs within a specified range or domain. For example, the platform 103 may access defined grid data 108 to within a range of X meters/miles by Y meters/miles from a focal point. The focal point may be specified as a zip code, specific set of coordinates, address, name of a point-of-interest, keyword or the like. Under this scenario, the affinity determination platform 103 cross-references the category data 107a against the various location data points from the database 108 to within a finite range for enabling analysis. As will be discussed more fully later on with respect to the exemplary use cases described in FIGS. 4C and 4D, the platform 103 may cast or transmit data regarding the various contextual categories to one or more calling services 105a-105n having access to the platform 103.

In certain embodiments, the affinity determination platform 103 also determines a score and corresponding signal strength to associate with each of the assigned contextual categories for a defined geographic range. By way of example, in the case of a context category of "Business" with a corresponding business type of "Law Firms," a score may be generated based on the number of POIs identified as law firms. Under this scenario, the score may indicate a level of affinity, i.e., on a scale of 1-to-10, between POIs located within the defined geographic region and the different contextual categories. It is noted that the score may further indicate a specific level of likelihood of existence/presence of the associated POI, a density or concentration of POIs, a rate of occurrence of the POIs, or a combination thereof corresponding to the contextual category within the region.

In the case of a scaled ranking from 1-to-10, for example, a score of 8.2 may indicate a higher propensity for law firms to be located within one region than a score of 4.3 for another region. As another example, a score of 9.0 for POIs corresponding to the contextual category of "Restaurants" may indicate a higher propensity for restaurants to be located within the same geographic region than law firms. As yet another example, a score of 1.5 for POIs corresponding to the law firm type of "General Practice" may indicate a lower propensity for such firms to be within the specified geographic region than firms that specialize in "Mergers and Acquisitions" having a score of 6.3. Hence, a score may be associated with a specified region based on varying levels of granularity and specificity of contextual categories, thus corresponding to a plurality of subcategories—i.e., as per the level of granularity and specificity of the categories data 107a. In addition, the defined geographic region may also feature POIs that correspond to multiple different categories. Consequently, the affinity determination platform 103 may account for overlapping contextual categorizations for a single defined geographic region.

In addition to the score, signal strengths may also be generated to be associated with a defined geographic region. In certain embodiments, the signal strength corresponds to a color based indicator, wherein the color visually depicts a context to associate with the defined geographic range. By way of example, contextual categories corresponding to "Businesses" may be assigned a color of blue while those corresponding to "Restaurants" may be assigned the color red. Under this scenario, different contextual categories may be readily distinguished by users when rendered, in connection with the defined grid data 108, to an interface. Also, the signal strength corresponds to a level of affinity between a respective contextual category and the various points-of-interest actually located within that region; and may be related to the assigned score. Hence, the signal strength may be represented in the form of a graphic, chart (e.g., bar graph), metric indicator, or the like, for indicating a level of affinity from low to high. In the case of a bar graph, for example, the length of the bar may visually indicate the relative level of affinity.

It is noted the signal strength does not correspond to a wireless signal associated with a particular wireless carrier or telecommunication service provider. Rather, the signal strength is a metaphorical representation of the level of effectiveness and prevalence of POIs matching a given contextual category for a defined region. For example, in the case of a region defined by the United States National Grid, the signal strength indicates the effectiveness or prevalence of a particular context for this defined grid. Hence, the prevalence of a particular context will change based on the characteristics of the geographic region and related POIs—i.e., residential versus industrial, urban versus rural, social demographics, income, environmental conditions, etc.

In certain embodiments, scores are calculated by the affinity determination platform 103 based on a scoring algorithm or other data ranking technique. The scoring algorithm may rank or score a particular contextual category for a given defined region based on various scoring criteria. The criteria may include one or more variables that are culled from the data points associated with respective categories for a particular geographic region. By way of example, the criteria may include the number of known POIs for a given contextual category or type (e.g., total number of restaurants, libraries, schools, gymnasiums), a number of sub-categories associated with the contextual category type, a popularity rating associated with the contextual category type or population density. Other criteria may also include address data (e.g., as per the defined grid data 108, the category data 107a, or other location data source) or a number of residential, commercial or landmark properties within proximity of a given address within the geographic region.

Still further, the scoring algorithm may also process existing signal strength data for a particular contextual category. Under this scenario, the score may be abstracted from the signal strength associated with the category or other related categories for the defined geographic area. Of note, the scoring algorithm may be adapted to accommodate varying types of scoring scenarios and procedures.

In certain embodiments, the affinity determination platform 103 also determines the occurrence of anomalies in a score assigned to a particular contextual category. The anomaly may correspond to a discrepancy between the score and information regarding the various POIs within the defined geographical region. By way of example, the platform 103 may flag a 8.5 score assigned to a Cajun restaurant as anomalous in response to determining few associated data points exist for indentifying the presence of restaurants specializing in Cajun cuisine. As another example, the platform 103 may determine an anomalous score and signal strength occurrence in an instance where a contextual category of "Barber Shop" is erroneously associated with data points corresponding to a butcher shop for the defined geographic area.

In response to an anomaly, the affinity determination platform 103 generates an updated score to associate with the at least one contextual category based on information related to the points-of-interest. By way of example, the updated score is produced based on a normalization of the scores and the anomalous score. The normalization may be performed based on analysis of information related to the various POIs, including data points maintained as category data 107a. Under this scenario, data points of interest for performing the normalization may include information regarding the number of POIs related to a particular context.

In keeping with the previous example regarding the Cajun restaurant, the number of actual/known restaurants that specialize in Cajun cuisine is culled from the data 107a. In addition, the number of restaurants within the defined geographic region is determined; such as to determine the relative preponderance of Cajun restaurants to the entirety of restaurants. Based on this information, the anomalous score and the scores assigned to the various other restaurant categories are reduced by a common factor corresponding to the preponderance, the total number of restaurants, etc. It is noted that various different normalization factors may be considered for performing the data normalization. Moreover, various data transformation techniques, including those performed by way of one or more models 107b may be employed.

In addition to the above scenario, the affinity determination platform 103 also can perform a comparison of the normalized score against verification information retrieved from various sources other than the category database 107a. The comparison enables the updated score to be further refined based on the culling of additional information for verifying the contextual category associated with the defined geographic region. As noted previously, the level of affinity may be enhanced to the extent relevant information is accounted for in verifying the effectiveness or prevalence of a context. Information retrieved from the various sources may include, for example, public information such as various online content servers, location databases, property information repositories, and the like. In addition, wireless carrier information such as the relative location and usage statistics for a given business or building may also be culled. In the later scenario, the wireless carrier information may be provided to the affinity determination module based on a partnership or shared operational arrangement.

In addition to generating the updated score, the affinity determination platform 103 also updates the signal strengths relative to the scores and the updated score in real-time. By way of example, a predictive based model (e.g., constructed using Predictive Modeling Markup Language (PMML)) may be used to process the scores along with verification information related to the different POIs for determining a change in value of the scores and associated signal strengths. The models 107b may be accessed by the affinity determination platform 103 from an independent cloud-based platform—thus ensuring different services 105 and/or applications 118 access the affinity determination platform 103 based on their own requirements. As a platform and schema independent solution, the provider of the affinity may define one or more models 107b independent of various service providers that mine the output database generated by the platform 103 for storing results. Of note, service providers having access to the affinity determination module 103, i.e., via a subscription arrangement, may employ standard schema, data definitions, and other data structuring requirements to accommodate different access and usage needs.

As mentioned above, the scores, the updated score and signal strengths for respective contextual categories of the defined geographic region are stored by the affinity determination module 103 for subsequent retrieval. Hence, the defined grid data 108 is stored in connection with the determined contextual categories and scoring data. This is depicted, by way of example, as output data 110. By storing this model output in association with a specified context, i.e., context binding, various calling services 105 may retrieve the data in real-time via a user interface generated by the platform 103. This includes retrieval of locus coloring information for the entire defined geographic domain or specific portions thereof (e.g., Midwest Region only). As time progresses, the color associated with the signal strengths as presented via the interface are also dynamically updated. The color coding associated with a given context is dynamically adapted, such as to refine the convergence of a locus coloring for the defined geographic region.

In certain embodiments, it is contemplated the color scheme may be used by providers of various services 105a-105n as a means of categorizing and identifying different defined geographic regions (e.g., Foodie regions versus Industrial regions) by context or vice versa. Still further, service providers may access the output 110 rendered by the affinity determination platform 103 to enable real-time monitoring of consumer or user activity for a given context by geographic region. For example, a coupon service provider may monitor real-time adaptations in scores and signal coloring trends in order to target specific markets or coordinate ad campaigns.

It is noted that the above described approach whereby various services 105 may access contextually relevant location data is in contrast to performing data acquisition based on user related data and characteristics. Under this approach, demographic data, behavioral data, profile information or user device 101 generated sensor data is not required to support application 118 use.

It is noted that user devices (UDs) 101a-101n may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. It is also contemplated that the UDs 101a-101n can support any type of interface for supporting the presentment or exchange of data. In addition, user devices 101a-101n may facilitate various input means for receiving and generating information, including touch screen capability, keyboard and keypad data entry, voice-based input mechanisms and the like. Any known and future implementations of user devices 101 are applicable. For the purpose of illustration, UDs 101a-101n may be devices for accessing the affinity determination platform 103 as a user of an application 118 or as a service provider.

In certain embodiments, user devices 101a-101n, the affinity determination platform 103, services 105 and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Networks 109-115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication network 105 may embody or include portions of a signaling system 7 (SS7) network, Internet protocol multimedia subsystem (IMS), or other suitable infrastructure to support control and signaling functions.

It is noted, though not shown in the figure, that in certain embodiments user devices 101a-101n may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router.

Figure 2:
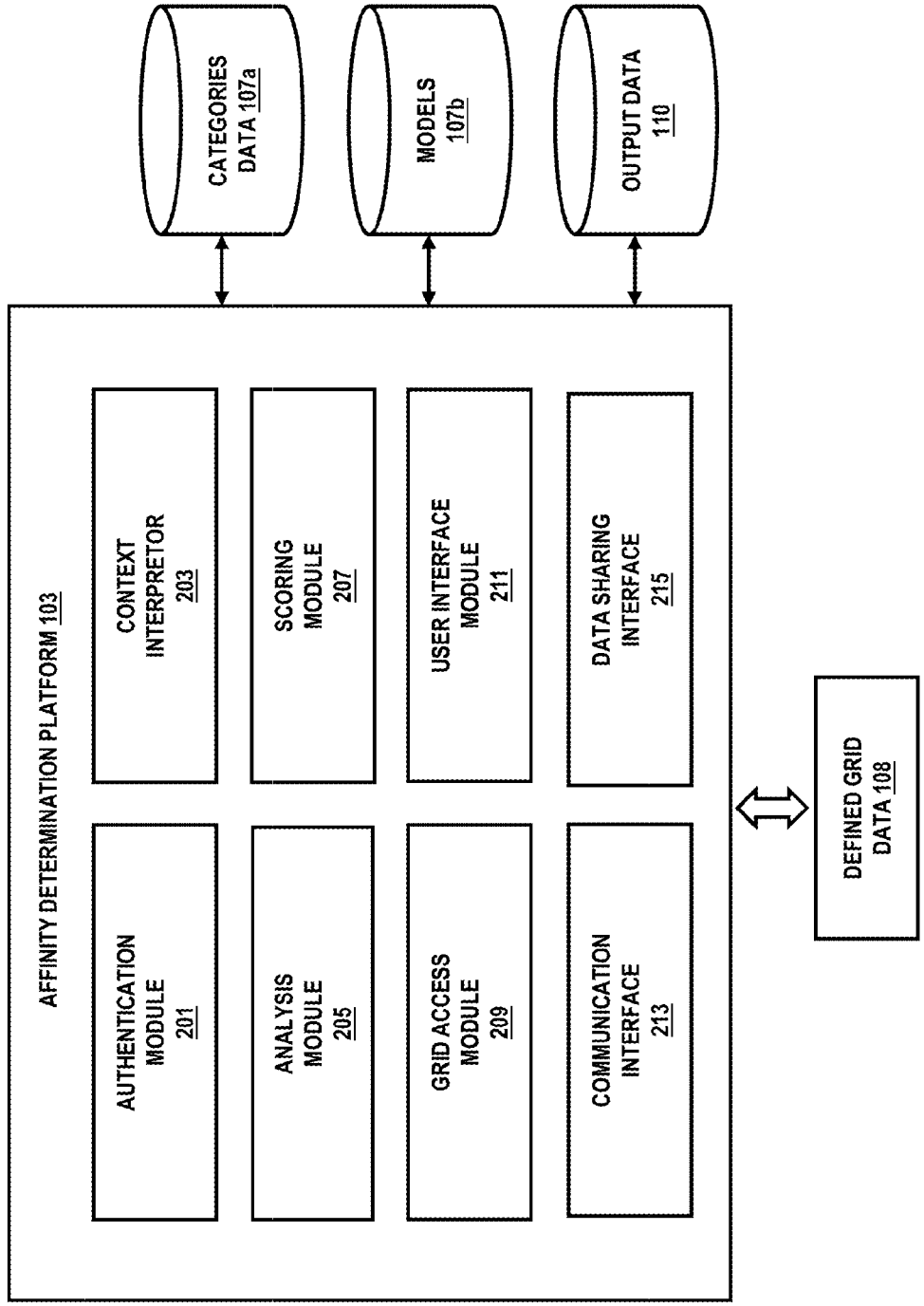
FIG. 2 is a diagram of the components of an affinity determination platform, according to one embodiment.

FIG. 2 is a diagram of an affinity determination platform, according to one embodiment. The affinity determination platform 103 includes various executable modules for performing one or more computing, data processing and network based instructions that in combination provide a means of enabling various contextual categories to be associated with and scored by their level of affinity with various points-of-interest located within a defined geographic region. Such modules can be implemented in hardware, firmware, software, or a combination thereof. By way of example, the affinity determination platform 103 may include a registration module 201, a context interpreter 203, an analysis module 205, a scoring module 207, a grid access module 209, a user interface module 211, communication interface 213 and a data sharing interface 215.

In addition, the analysis determination platform 103 also maintains or accesses various databases, including a category database 107a for storing context categories (by context type and associated data points), a models database 107c for maintaining one or more models generated by the provider of the platform or by one or more service providers, a defined grid database for accessing data regarding the defined geographic region, and an output database 110 for storing the result set generated by the platform 103. It is noted that modules 201-215 access one or more of these databases for performing their respective functions.

In one embodiment, an authentication module 201 authenticates users (e.g., those related to a service provider) of user devices 101a-101n for interaction with the affinity determination platform 103. By way of example, the authentication module 201 receives a request to subscribe to the platform for enabling on demand access to color coded, contextually defined location information. The subscription process may include, for example, establishing one or more access credentials and usage policies. One or more privacy settings and/or preferences may also be established. Preferences and settings information may be referenced to a specific user, user device, service provider, or combination thereof, and maintained as subscription data (not shown).

The authentication process performed by the module 201 may also include receiving and validating access credentials or established for a particular user. For example, a login name and/or user identification value may be received from the user device 101 or other device via a graphical user interface to the platform 103 (e.g., as enabled by user interface module 215). Subscription data for respective subscribers, which contains pertinent user or device profile data, may be cross referenced as part of the login process. Alternatively, the login process may be performed through automated association of profile settings maintained as registration data 217 with an IP address, a carrier detection signal of a user device, mobile directory number (MDN), subscriber identity module (SIM) (e.g., of a SIM card), radio frequency identifier (RFID) tag or other identifier.

The authentication module 201 may also be configured to automatically enable the retrieval output data by various service providers in response to a request from an application or service related to the provider. Under this approach, the authentication module receives the request and passes it to the various other modules to accommodate the requirements of the request. It is noted that the authentication module 201 may also retrieve various models 107b based on the request type to be fulfilled or the service provider/service that requested the output data 110 or portions thereof.

In one embodiment, the context interpreter 203 identifies a specific set of contextual categories, per the categories data 107a, are to be related to a particular defined geographic region. The interpreter 203 then associates a particular color code with a particular contextual category. In the case of a fully generated output 110, featuring a set of defined geographical region data in connection with scores, signal strengths and contextual categories, the interpreter 203 may also operate in connection with a user interface module to affect presentment of the output. For example, the content interpreter 103 may cause various descriptors relating to the different contextual categories to be rendered to a user interface for supporting service provider interpretation of the results set 110. More regarding the descriptors for the various contextual categories is discussed more fully with respect to FIG. 4A.

In one embodiment, the analysis module 205 calculates or analyzes scores and/or corresponding signal strength information associated with the different contextual categories of a defined geographic region. The analysis module 205 calculates the scores in instance where no prior score is associated with a given contextual category assigned to a particular defined geographic region. Under this scenario, the score is determined based on analysis of the context type and associated data points corresponding to the context type, including qualitative and quantitative details (e.g., a number of POIs, a sales volume) regarding the category. Based on this analysis, an initial score and corresponding signal strength is associated with the contextual category; subject to refinement over time or real-time refinement depending on the frequency of updating of various data points associated with respective contextual categories.

The analysis module 205 also analyzes current score data against the respective data points to determine if an anomaly exists in any score assigned to a specific contextual category for a defined region. The anomaly may correspond to a discrepancy between the score and information regarding the various POIs within the defined geographical region—i.e., the score is determined to be higher than expected relative to the limited number of actual locations, events, services or other POIs within the defined geographic range. The analysis module 205 may be configured to perform analysis of the scores and associated data points (e.g., information regarding the points of interest) periodically or on demand to accommodate different service providers, services and application requirements.

In one embodiment, the scoring module 207 operates in connection with the analysis module to generate and update scores. Similar to the analysis module 205, the scoring module 207 may rely upon various processing models 107b and scoring algorithms to generate scores. In addition, the scores may be developed based on the analysis results rendered by the analysis module 205.

The scoring algorithm used may rank or score a particular contextual category for a given defined region based on various criteria mined from the categories database 107a (e.g., various data points relating to one or more POIs). By way of example, the criteria may include the number of known POIs for a given contextual category or type (e.g., total number of restaurants, libraries, schools, gymnasiums), a number of sub-categories associated with the contextual category type, a popularity rating associated with the contextual category type or population density. Other criteria may also include address data (e.g., as per the defined grid data 108, the category data 107a, or other location data source) or a number of residential, commercial or landmark properties within proximity of a given address within the geographic region.

Also, in certain embodiments, the scoring module 207 facilitates generation of a normalized score, such as to render an updated score and/or signal strength in response to a determined discrepancy/anomaly. Per this execution, the scoring module 207 and analysis module 205 may perform a comparison and contrasting of the data pertaining to the various POIs (e.g., data points for a particular context type) with verification data relating to said POIs. The verification data may include publicly available data or wireless carrier proprietary data. It is noted that the scoring module 207 may access various data sets for generating scores via the communication interface 213 accordingly.

In one embodiment, the grid access module 209 retrieves the defined geographical range data, maintained as defined grid data 108, from a data source. This includes retrieval of an entire reference grid or portions thereof for enabling the analysis and scoring capabilities of the analysis and scoring modules 205 and 207, respectively. In addition, the grid access module compiles the output data 110. As such, the grid access module 209 persistently updates the output data 110 in response to the persistent updating of scores and signal strengths for a defined geographic domain. Of note, the grid access module 209 may also enable execution of various filters for permitting searching of the output data, such as to restrict the data results by contextual category, context type, signal strength, score, location, etc.

In one embodiment, the data sharing interface 215 operates in connection with the authentication module 201 and user interface module 211 to permit the accessing of the output data 110 by various service providers. The data sharing interface may retrieve various models 107b, including one or more predictive models, in which to mine the output data 110 with respect to a particular application and/or service. Hence, the data sharing interface 215 may access a cloud based repository wherein various models corresponding to a specific service provider are stored. For the purpose of illustration, the models 107b correspond primarily to a predictive model maintained by the platform 103 and are used for predictive analytics of scores and signal strengths relative to changing temporal factors and points-of-interest characteristics. It is noted, however, that various other model types may also be employed.

In one embodiment the user interface module 211 enables presentment of a graphical user interface for presenting the output data 110. By way of example, the user interface module 211 generates the interface in response to application programming interfaces (APIs) or other function calls corresponding to a browser application or dedicated application; thus enabling the display of graphics primitives. As another example, the user interface module 211 may also operate in connection with a calling service or application to permit rendering, transformation, or translation of the output data in response to a request.

In one embodiment, a communication interface 213 enables formation of a session over a network 109 between the affinity determination platform 103 and the services 105 and user devices 101. By way of example, the communication interface 213 executes various protocols and data sharing techniques for enabling collaborative execution between a subscriber's user device 101 (e.g., mobile devices, laptops, smartphones, tablet computers, desktop computers, servers, workstations) and the platform 103 over the network 109. It is noted that the communication interface 213 is also configured to support a browser session—i.e., the retrieval of content as referenced by a resource identifier during a specific period of time or usage of the browser.

The above presented modules and components of the platform 103 can be implemented in hardware, firmware, software, or a combination thereof. Though depicted as a separate entity in FIG. 1, it is contemplated that the biometric authenticator 103 may be implemented for direct operation by respective user devices 101a-101n. As such, the affinity determination platform 103 may generate direct signal inputs by way of the operating system of the user device for interacting with the calling services 103 or applications 118. In another embodiment, one or more of the modules 201-215 may be implemented for operation by respective user devices as a platform, hosted solution, cloud based service, or the like. It is noted that the various modules may be used selectively or in combination within the context of a location based service.

Figure 3B:
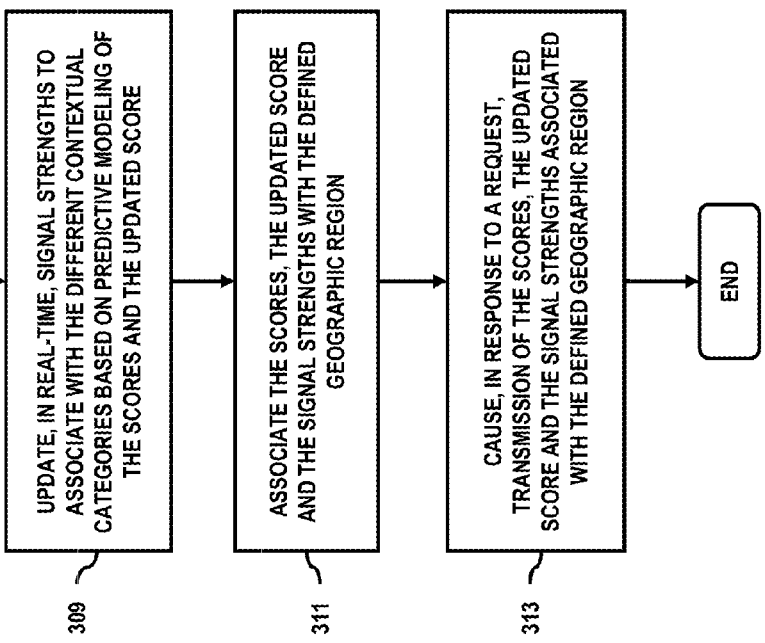
FIGS. 3A-3C are flowcharts of processes for enabling contextual categories to be associated and scored in connection with a defined geographic region, according to various embodiments.
Figure 3A:
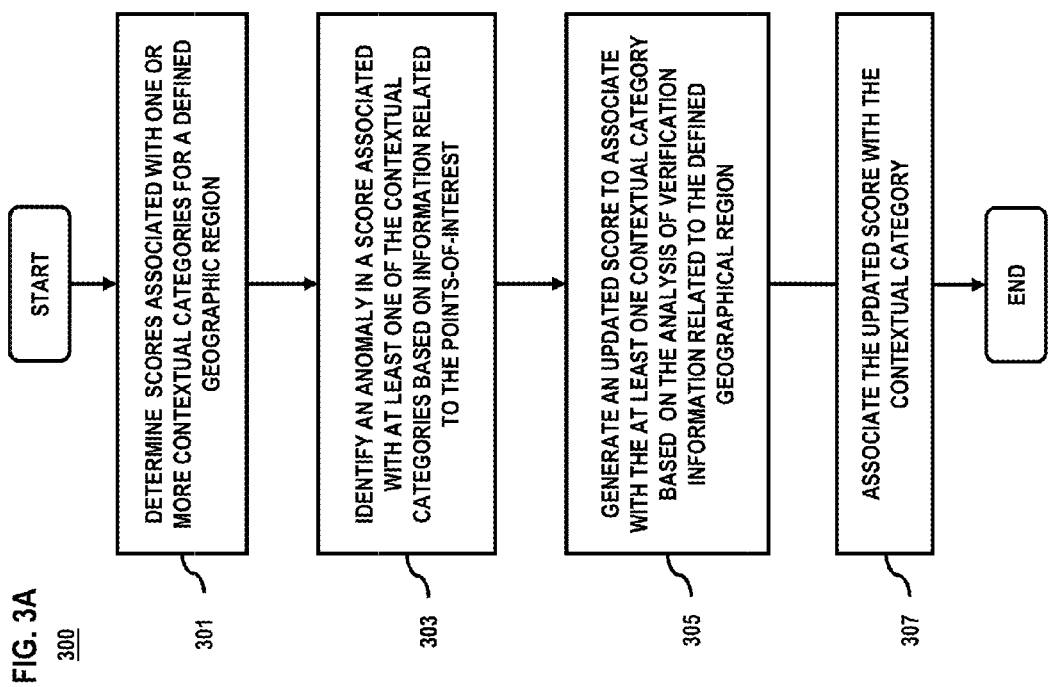
Figure 3C:
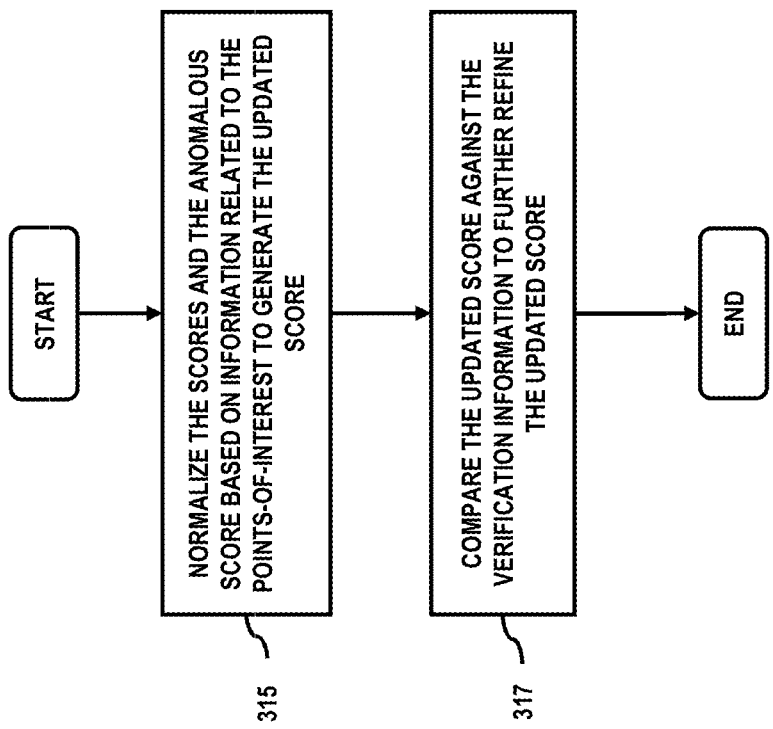
Figure 6:
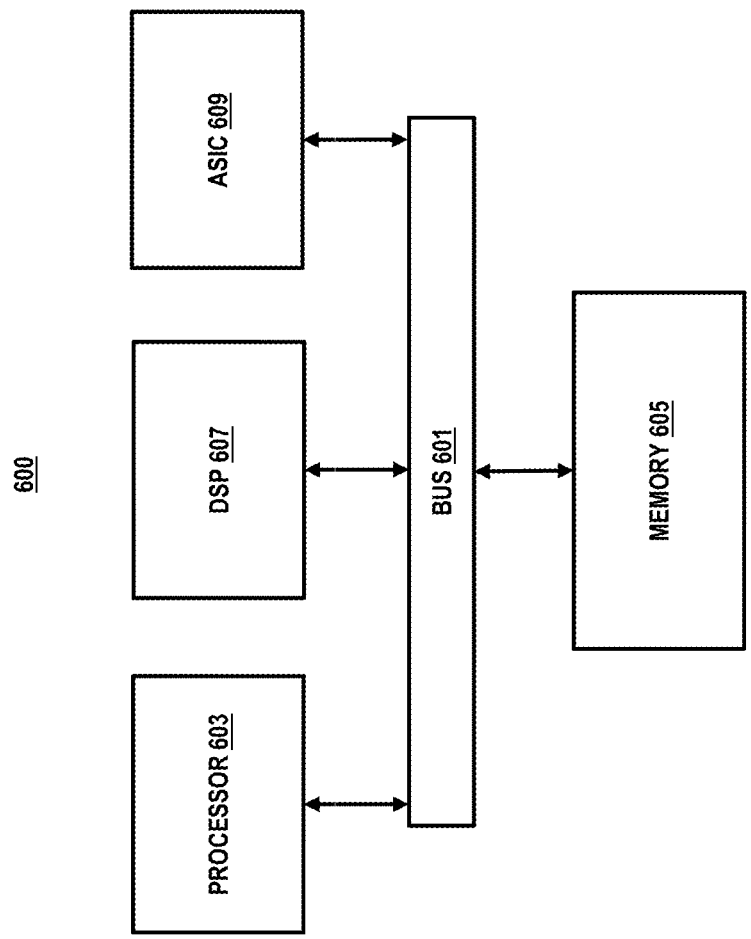
FIG. 6 is a diagram of a chip set that can be used to implement an embodiment of the invention.

FIGS. 3A-3C are flowcharts of processes for enabling contextual categories to be associated and scored in connection with a defined geographic region, according to various embodiments. In one embodiment, the affinity determination platform 103 performs processes 300, 308 and 314 are implemented in, for instance, a chip set including a processor and a memory as shown in FIG. 6. For the purpose of illustration, the processes are described with respect to FIG. 1. It is noted that the steps of the process may be performed in any suitable order, as well as combined or separated in any suitable manner.

In step 301 of process 300 (FIG. 3A), the affinity determination platform 103 determines scores associated with one or more contextual categories for a defined geographic region. As mentioned previously, the scores indicate a level of affinity between points-of-interest located within the defined geographic region and the contextual categories. The contextual categories may include data for defining various context types, including a market type, a service type, a business type, an activity type, a product type, an event type or a promotion type at different levels of granularity. In addition, the contextual categories may be associated with data points for representing characteristics of the points-of-interest within the defined geographic region.

In step 303, the platform 103 identifies an anomaly in a score associated with at least one of the contextual categories based on information related to the points-of-interest. As mentioned previously, the contextual categories may be defined as a combination of data for indicating various context type and associated data points. The data points may correspond to data for quantifying or characterizing the one or more points-of-interest related to a particular contextual category.

In step 305, the platform 103 generates an updated score to associate with the at least one contextual category based on the analysis of verification information related to the defined geographical region. The verification information may include, for example, information regarding a wireless carrier or service provider (e.g., network and/or location data) or public information. The public information may include various websites or repositories for use in confirming the existence, presence, location, relevance or other details regarding a given point-of-interest within a defined geographic region. Per step 307, the platform 103 associates the updated score with the contextual category.

In step 309 of process 308 (FIG. 3B), the platform 109 updates, in real-time, signal strengths to associate with the different contextual categories based on predictive modeling of the scores and the updated score. The predictive model may be used to process the scores along with verification information related to the different POIs for determining a change in value of the scores and associated signal strengths. In step 311, the affinity determination platform 111 also associates the scores, the updated score and the signal strengths with the defined geographic region.

Per step 313, the platform 103 causes, in response to a request, transmission of the scores, the updated score and the signal strengths associated with the defined geographic region. This corresponds to accessing of the output data set (e.g., 110), which may be retrieved based on various data mining techniques or based on various data retrieval protocols. The request may also be facilitated based on various models—i.e., those generated by a service provider—including data transformation models, analytic models, models corresponding to the specific application or service, or the like.

In step 315 of process 314 (FIG. 3C), the affinity determination platform 315 normalizes the scores and the anomalous score based on information related to the points-of-interest to generate the updated score. Per step 317, the platform 103 compares the updated score against the verification information to further refine the updated score. It is noted that scores and strengths are refined and eventually updated in response to the adaptation of information regarding the various points-of-interest (e.g., events, places, venues, etc.).

FIGS. 4A and 4B are tables maintained by the affinity determination platform for defining different contextual categories, according to various embodiments. For the purpose of illustration, these tables correspond to data or subsets thereof as maintained in the category database 107a. As mentioned previously, the platform 103 accesses the category data 107a to enable the association of specific context types and associated data points with a defined geographic region. Also, in certain embodiments, the content interpreter 203 accesses the table 400 of FIG. 4A to render details to users regarding the use and/or structure of category data 107a.

In FIG. 4A, the first column 401 of the table 400 defines various context types while a second column 403 defines the various data points associated with a given context type. By way of example, the context type 403 of "Coupon Redemption" corresponds to retail and/or consumer transaction related matters. As per the description 409, data points associated with this particular context type include, for example, coupon redemption data by number of items sold and revenue index. These data points may be further compiled by length of campaign, campaign type, etc. Hence, under this scenario, coupon activity for a defined geographic region may be accessed and scored by the affinity determination platform 103 accordingly.

In FIG. 4B, a table 410 is shown per the specific context type 403. In this example, various coupon redemption categories (or subcategories) corresponding to the specified context type are shown. Under this scenario, the redemption categories are delineated by service and/or product type as well as the number of items/products sold relative to the service and/or product type. Thus, in the case of data point(s) 413 related to the subcategory of Golf, a corresponding number coupons redeemed for this category is featured.

It is noted that the categories/subcategories may be delineated in various other ways, including by product code or manufacturer. Also, while the example herein is related to retail, other incentive or activation offers may apply. Also, the affinity determination platform 103 may be employed in connection with various other contexts including law enforcement or social services. For this context, the data points may correspond to a number of crimes, a number of deaths, a number of births, a number of families, etc., within a defined geographic region.

Figure 4C:
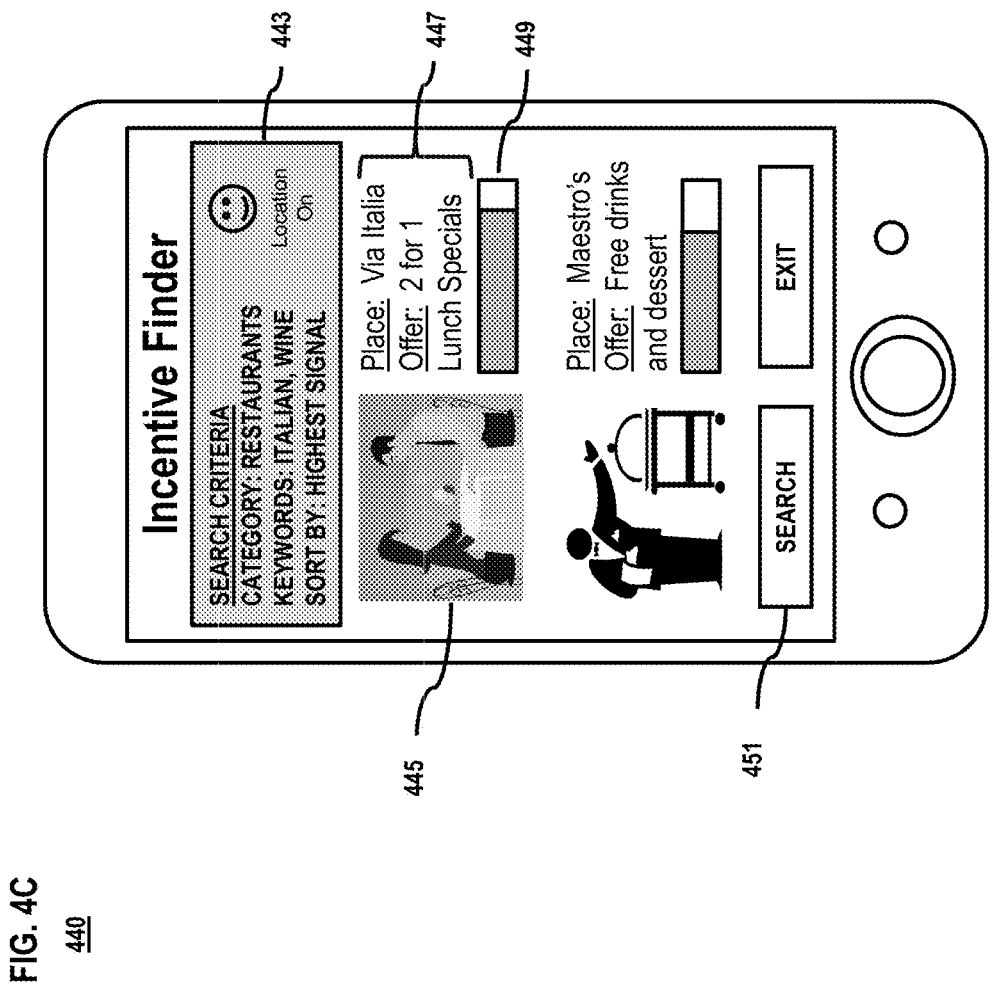
FIGS. 4C and 4D are diagrams of services that employ the affinity determination platform to enable various features, according to various embodiments.
Figure 4D:
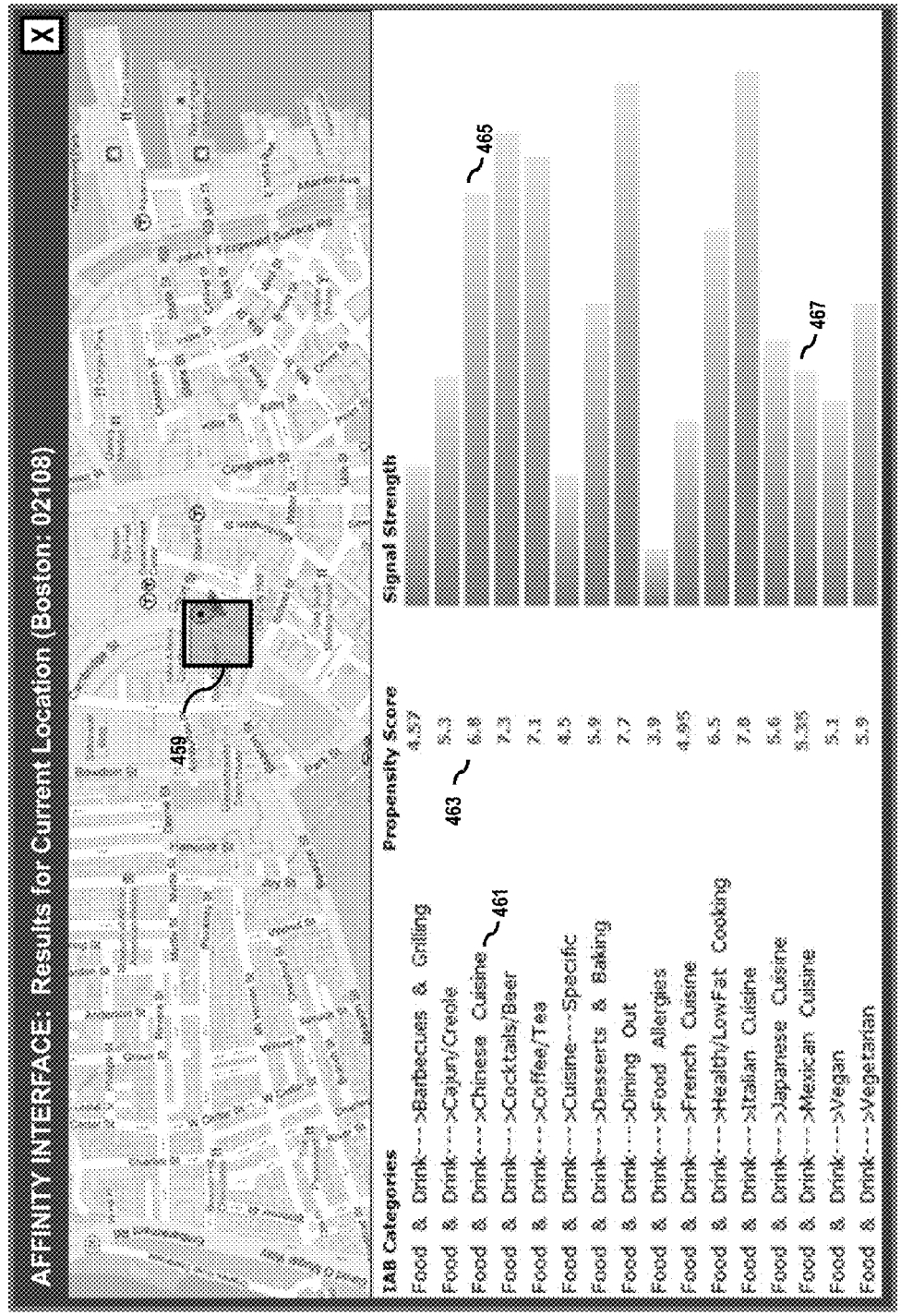

FIGS. 4C and 4D are diagrams of services that employ the affinity determination platform to enable various features, according to various embodiments. For the purpose of illustration, FIGS. 4C and 4D are described from the perspective of different use cases.

In FIG. 4C, a user employs an incentive finder application via their mobile device 440 to locate deals within a defined geographic region of which they are located (e.g., their present location). The incentive finder application operates at the client and is supported by a backend location based system maintained by a service provider. The service provider retrieves data from the affinity determination platform 103 to enable various features. For example, the user is able to define various search criteria via a search criteria selection/input menu 443, including the category by which to conduct the search (e.g., Restaurants), various keywords of interest (Italian, Wine), and results sortation criteria (e.g., Highest Signal Strength). It is noted that various other criteria may also be defined depending on the application. The search criteria corresponds to a search context, and thus associated context type and data points, in which to identify one or more bound/matching POIs.

In this example, the sortation criteria of Highest Signal Strength may correspond to a number of scoring and/or signal strength considerations. For example, by selecting this option, the results rendered may be ordered according to which restaurants offer the most incentives within the location of the user, the highest number of offers redeemed for restaurants within the location of the user, the highest rated within the location of the user, or a combination of such factors. While not shown, the service provider may enable the users to configure the incentive finder application to accommodate different scenarios. For this scenario, upon activation of the SEARCH action button 451, the user is presented with a list of corresponding POIs—i.e., restaurants corresponding to the search criteria 443.

The results set includes an icon (e.g., 445) for the restaurant, a descriptor (e.g., 447) for providing details regarding the restaurant and the associated offer/incentive and a signal strength indicator (e.g., 449) for visually depicting the level of affinity of the restaurant with the defined context (the search criteria). In this use case, the signal strength indicator 449 corresponding to the defined contextual category (Restaurants) is directly integrated for use in the application. This enables the user to scroll through various options to select the offer most related to their desired context.

In FIG. 4D, a user subscribed to the platform 103 accesses a user interface to the platform 103 to monitor scores and signal strengths associated with a given contextual category. Under this scenario, the defined geographic region 459 to which the various scores and signal strengths correspond is presented against mapping information. The contextual category is defined as "Food & Drink", which further corresponds to various subcategories. For example, the "Food and Drink" category may be further abstracted into Chinese Cuisine (445).

A score 445 of 6.8 and corresponding signal strength indicator 465 indicate that there is a higher preponderance of POIs for this location 459 than some of the other categories. By way of example, the signal strength indicator 467 associated with the "Food & Drink" category of Mexican Cuisine can be visually discerned by the user as having lesser affinity with the defined geographic region 459. By way of this interface, the user is also able to readily identify the context based on a color coding scheme associated with each contextual category. It is contemplated that a mixture of colors may be visually rendered to the interface at varying levels of intensity or expanse for indicating the relationship/affinity between a myriad of contextual categories and the defined geographic region 459.

The exemplary techniques and systems presented herein enables contextual categories to be associated and scored in connection with a defined geographic region. One advantage of the exemplary techniques and systems presented herein is the ability to define a context with a location without reliance upon sensor data or user demographic information. Another advantage is the ability to automatically predict anomalies in generated scores and signal strengths relative to POI changes within the defined region.

The processes described herein for enabling contextual categories to be associated and scored in connection with a defined geographic region may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
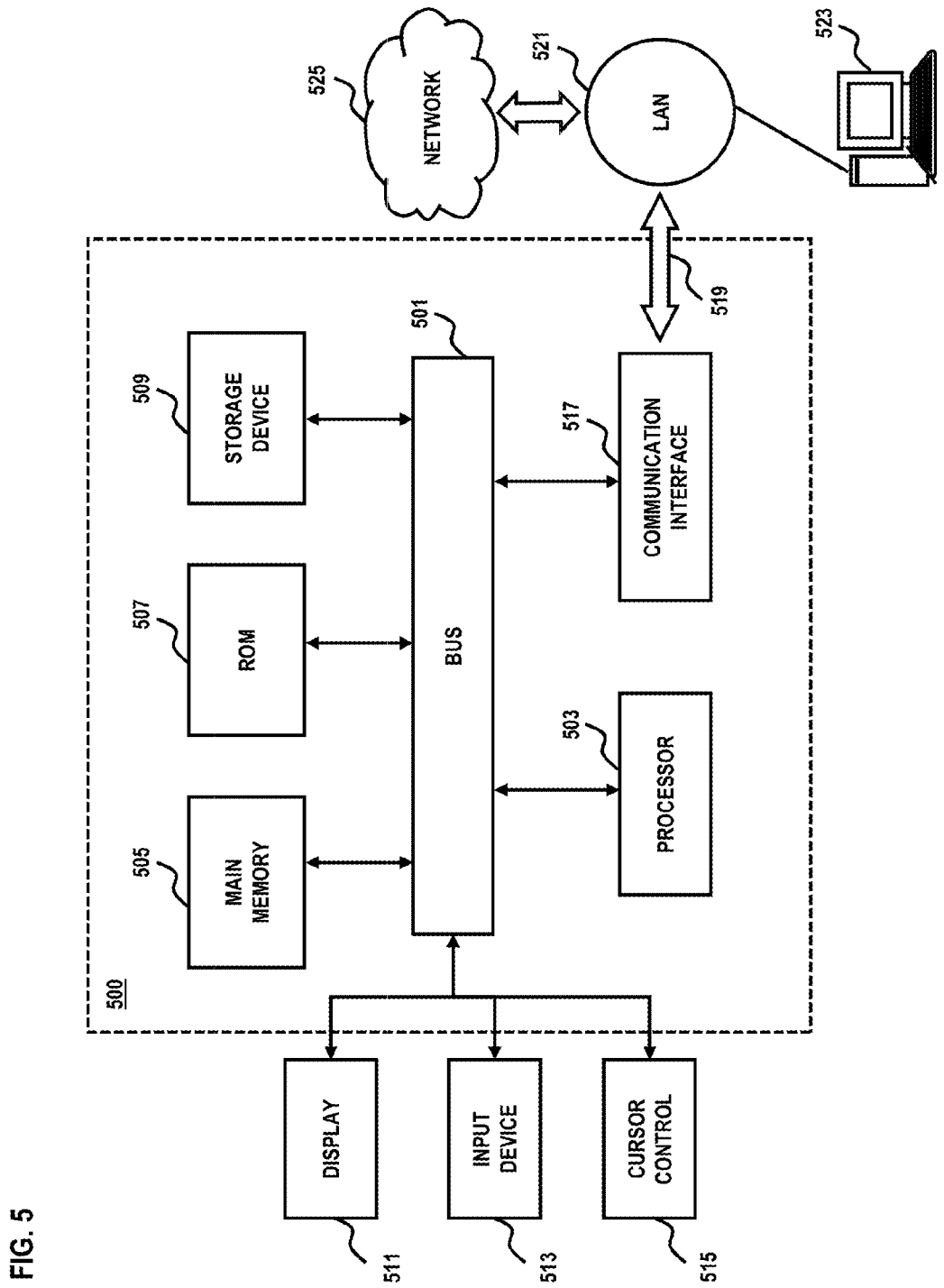
FIG. 5 is a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc.

Although a single communication interface 517 is depicted in FIGS. 4C and 4D, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to enable contextual categories to be associated and scored in connection with a defined geographic region as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of enabling contextual categories to be associated and scored in connection with a defined geographic region.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to enable contextual categories to be associated and scored in connection with a defined geographic region. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    determining scores associated with one or more contextual categories for a defined geographic region, the scores indicating a level of affinity between points-of-interest located within the defined geographic region and the one or more contextual categories;
    identifying an anomaly in a score associated with at least one of the one or more contextual categories based on information related to the points-of-interest;
    generating an updated score to associate with the at least one contextual category, based on an analysis of verification information related to the defined geographical region and on a normalization of the scores and the score with the anomaly by reduction with a normalization factor corresponding to a total number of the points-of-interest; and
    associating the updated score with the at least one contextual category,
    wherein the level of affinity is based on a density, a concentration, a rate of occurrence, or a combination thereof, of the points-of-interest associated with the one or more contextual categories, for the defined geographic region.

2. A method of claim 1, further comprising:
    updating, in real-time, signal strengths to associate with the one or more contextual categories based on predictive modeling of the scores and the updated score; and
    associating the scores, the updated score and the signal strengths with the defined geographic region.

3. A method of claim 2, wherein the signal strengths correspond to a color based indicator for visually depicting the level of affinity between the points-of-interest located within the defined geographic region and the one or more contextual categories.

4. A method of claim 1, further comprising:
    causing, in response to a request, transmission of the scores, the updated score and signal strengths associated with the defined geographic region,
    wherein the request is based on a specified geographic region, a specified location, a specified context, specified scores or a specified signal strength.

5. A method of claim 4, wherein the request is initiated by a service via a communication network.

6. A method of claim 1,
    wherein the information related to the points-of-interest include data points for indicating characteristics and quantities of the points-of-interest for the defined geographic region.

7. A method of claim 6, further comprising:
    comparing the updated score against the verification information to further refine the updated score,
    wherein the verification information includes public information and wireless carrier information associated with the defined geographic region.

8. A method of claim 1, wherein the defined geographic region is based on a national grid system.

9. A method of claim 1, wherein the one or more contextual categories are based on a market type, a service type, a business type, an activity type, a product type, an event type or a promotion type at different levels of granularity and the one or more contextual categories are associated with data points for representing characteristics of the points-of-interest within the defined geographic region.

10. An apparatus comprising:
    at least one processor; and
    at least one memory including computer program code for one or more programs,
    the at least one memory and the computer program code configured to, with the at least one processor, cause the apparatus to perform at least the following,
        determining scores associated with one or more contextual categories for a defined geographic region, the scores indicating a level of affinity between points-of-interest located within the defined geographic region and the one or more contextual categories;
        identifying an anomaly in a score associated with at least one of the one or more contextual categories based on information related to the points-of-interest;
        generating an updated score to associate with the at least one contextual category based on an analysis of verification information related to the defined geographical region and on a normalization of the scores and the score with the anomaly by reduction with a normalization factor corresponding to a total number of the points-of-interest; and
        associating the updated score with the at least one contextual category,
        wherein the level of affinity is based on a density, a concentration, a rate of occurrence, or a combination thereof, of the points-of-interest associated with the one or more contextual categories, for the defined geographic region.

11. An apparatus of claim 10, further comprising:
    updating, in real-time, signal strengths to associate with the one or more contextual categories based on predictive modeling of the scores and the updated score; and
    associating the scores, the updated score and the signal strengths with the defined geographic region.

12. An apparatus of claim 11, wherein the signal strengths correspond to a color based indicator for visually depicting the level of affinity between the points-of-interest located within the defined geographic region and the one or more contextual categories.

13. An apparatus of claim 10, further comprising:
    causing, in response to a request, transmission of the scores, the updated score and signal strengths associated with the defined geographic region,
    wherein the request is based on a specified geographic region, a specified location, a specified context, specified scores or a specified signal strength.

14. An apparatus of claim 13, wherein the request is initiated by a service via a communication network.

15. An apparatus of claim 10,
    wherein the information related to the points-of-interest include data points for indicating characteristics and quantities of the points-of-interest for the defined geographic region.

16. An apparatus of claim 15, further comprising:
    comparing the updated score against the verification information to further refine the updated score,
    wherein the verification information includes public information and wireless carrier information associated with the defined geographic region.

17. An apparatus of claim 10, wherein the defined geographic region is based on a national grid system.

18. An apparatus of claim 10, wherein the one or more contextual categories are based on a market type, a service type, a business type, an activity type, a product type, an event type or a promotion type at different levels of granularity and the one or more contextual categories are associated with data points for representing characteristics of the points-of-interest within the defined geographic region.

19. A system comprising:
a categories repository for maintaining category data for one or more contextual categories;
a grid repository for maintaining grid data for a defined geographic region; and
an affinity determination platform configured to:
determine scores associated with the one or more contextual categories for the defined geographic region, the scores indicating a level of affinity between points-of-interest located within the defined geographic region and the one or more contextual categories;
identify an anomaly in a score associated with at least one of the one or more contextual categories based on information related to the points-of-interest;
generate an updated score to associate with the at least one contextual category, based on an analysis of verification information related to the defined geographical region and on a normalization of the scores and the score with the anomaly by reduction with a normalization factor corresponding to a total number of the points-of-interest; and
associate the updated score with the at least one contextual category,
wherein the level of affinity is based on a density, a concentration, a rate of occurrence, or a combination thereof, of the points-of-interest associated with the one or more contextual categories, for the defined geographic region.

20. A system of claim 19, wherein the information related to the points-of-interest includes data points for indicating characteristics and quantities of the points-of-interest for the defined geographic region.

* * * * *